UNITED STATES PATENT OFFICE.

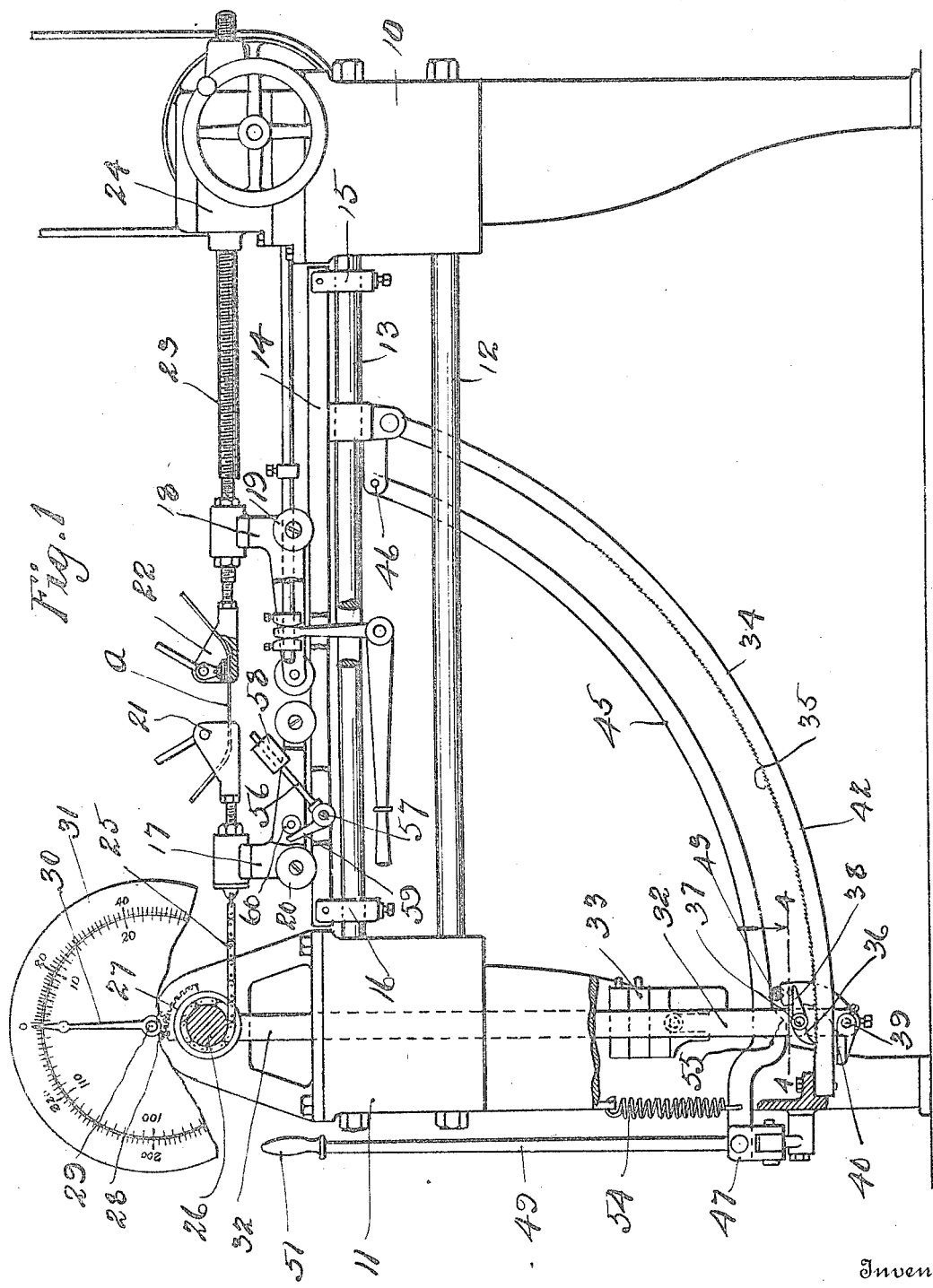

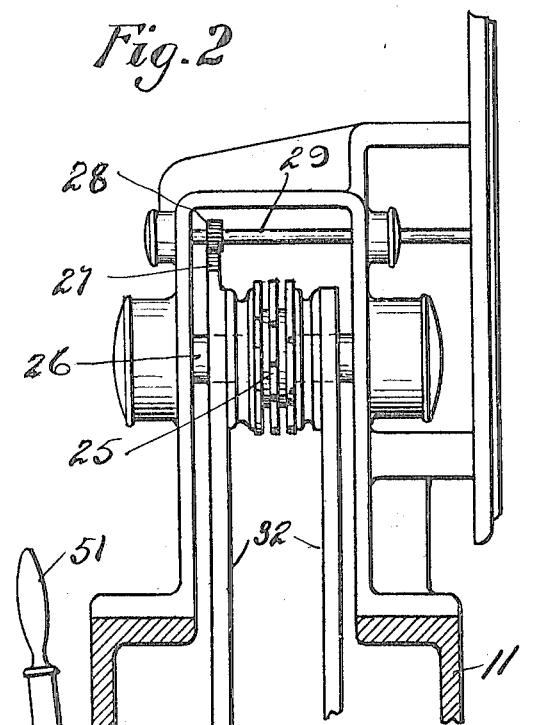
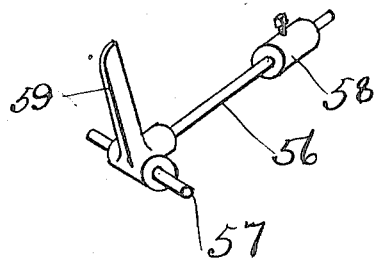
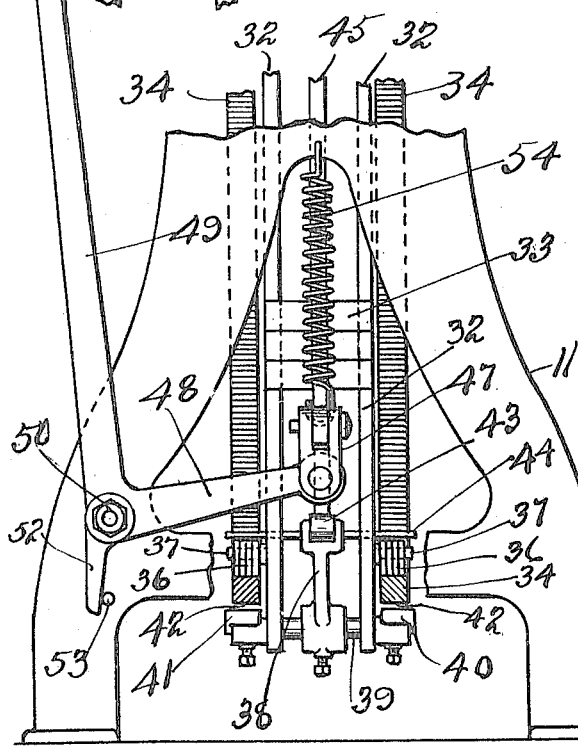
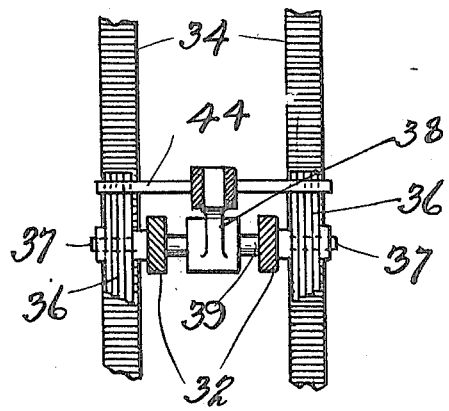

HENRY L. SCOTT, OF PROVIDENCE, RHODE ISLAND.

TESTING-MACHINE.

1,190,597.

Specification of Letters Patent.

Patented July 11, 1916.

Application filed July 7, 1915. Serial No. 38,439.

*To all whom it may concern:*

Be it known that I, HENRY L. SCOTT, a citizen of the United States, and resident of the city of Providence, in the county of Providence and State of Rhode Island, have invented certain new and useful Improvements in Testing-Machines, of which the following is a specification.

This invention relates to testing machines of the class designed to indicate or otherwise show the straining or breaking strength, in pounds or other unit of measure, of textile or other materials.

One of the objects of this invention is the provision of means in a machine of this character for applying tension to the goods to be tested, the exerting of this tension is arranged to move a weight or other resistance in proportion to the tension applied means are also provided whereby the weight may be temporarily retained in adjusted position and then released and its return to normal nicely controlled.

A further object of this invention is the provision of a pair of weighted arms mounted on an indicator operating hub, the tension means being connected to this hub intermediate these arms whereby the strain upon them is equalized and the friction upon the hub reduced to the minimum.

A still further object of the invention is the provision of an equalizing member for counterbalancing the effect of the inertia of the moving parts of the mechanism upon the indicator, so that the indicator member may accurately show the exact tension on the goods.

With these and other objects in view, the invention consists of certain novel features of construction, as will be more fully described, and particularly pointed out in the appended claims.

In the accompanying drawings: Figure 1— is a side elevation of my improved testing machine with portions partly broken away to better illustrate the action of the mechanism. Fig. 2— is an end view of the upper portion of the machine showing the indicator operating hub and the arrangement of the spaced apart weighted arms mounted thereon with the tension chain connected to the hub intermediate said arms. Fig. 3— is an end view showing the lower portion of the machine and illustrating the hand lever for controlling the return movement of the weighted arms. Fig. 4— is a plan view showing the spaced apart arrangement of the two rack bars, the plurality of pawls engaging each bar and pins on the brake lever for releasing the pawls from the rack as this lever is being moved to apply the brakes. Fig. 5— is a detail of the compensating member for counterbalancing the effect of inertia of the moving parts upon the indicator, so as to cause the indicator to show the actual tension on the goods without being affected by the friction of the moving parts.

The drawings illustrate a horizontal type of testing machine to which my improved mechanism is shown as being applied but the same may be applied to any other form of testing machine to which it may be adapted.

In the drawings 10 and 11 designate the opposite end frames of the machine which are connected together by means of tie rods 12 and 13. In some cases it is found that when a heavy tension is applied to the machine these rods have a tendency to spring slightly at their middle portion. To obviate this effect, I have mounted rails 14 disposed edgewise and supported at their opposite ends by clamps 15 and 16 on the rods 13 near the opposite end frames. Carriages 17 and 18 are mounted on wheels 19 and 20 to roll on the edge of these rails. Each of these carriages carries a gripping clamp 21 and 22 which is adapted to grip the strip of material *a* to be tested. The carriage 18 is connected by a screw 23 to the powerful pulling mechanism (not shown) and located within the casing 24. The opposite carriage 17 is connected through the chain 25 to the hub 26 to which hub is also connected the segments 27 and pinion 28, see Fig. 2, the latter being mounted on the shaft 29 which passes through end bearings and operates the pointer 30 over the graduated dial 31, also to this hub is connected the pair of depending arms 32, see Fig. 2, to which weights 33 are connected near their lower ends.

In order to operate a measuring device by the tension applied, I have provided yieldable resistance in the form of a rotatable hub to which the weighted arms 32 are attached and to this hub I have also connected means for moving the pointer 30 over a graduated dial 31, the graduations on the dial being in proportion to the resistance applied to the hub by these weight arms.

In order that the reading on the dial may be accurately obtained, I have provided simple and effective means whereby the weighted arms may be positively retained at any point up to the extreme end of their stroke, until it is desired to release the same and permit the arms to return to normal. To accomplish this, I have provided a pair of rack bars 34 curved to correspond to the radial swing of the arm, teeth 35 being formed on their upper edges to be engaged by one or more of a plurality of pawls 36 carried by the arms 32 on each of the pins 37. Each of the pawls of these two series are of slightly different lengths so that the arm need not be moved the space of a whole tooth, in order that at least one of the pawls shall engage, retain and prevent the arm from swinging backward.

It is found in practice, owing to the very heavy weights which are sometimes carried on these swinging arms, important to provide suitable and effective means whereby the arms carrying these weights may be quickly and readily returned to normal. In order to accomplish this in a simple and effective way, I have mounted a brake lever 38 on the short shaft 39 which receives its bearings in the lower ends of arms 32. On the outer ends of this shaft are mounted the brake shoes 40 and 41, see Fig. 3, which are adapted to engage the smooth under surface 42 of the rack bars 34. On the upper end of this lever 38 is mounted a friction wheel 43 for the purpose presently described and a laterally extending pin 44 is also connected to this lever to extend out over the ends of the pawls. In order to operate this lever 38, I have provided a bar 45 pivoted at its upper end at 46 and its lower end is connected by a link 47 to the arm 48 of the bell crank operating lever 49 which is pivoted at 50 to the frame. The upper end of this operating lever is provided with an operating handle 51 and its lower end is provided with a finger 52 adapted to engage a stop pin 53. A spring 54 is connected to the bar 45 to hold it in normal or raised position. At the lower end of this bar 45, I have formed a cam 55 which will act upon the lever 38 to automatically set the brakes with great force to prevent the arms 32 from swinging back too far beyond their normal position. When the arms have been raised by a testing operation, they are held at the extent of their stroke by means of the pawls 36 until after the indicator has been read and the tensile strength of the material noted. It is then only necessary that the operator should grasp the handle 51 of the operating lever 49 and pull the same forward, which action immediately causes the bar 45 to engage the roll 43 of lever 38, rotate the shaft 39 and cause the brake shoes 40 and 41 to engage the underside of the rack bars 34. This rocking movement of the lever 38 also causes the release pin 44 to engage and raise the pawls from engagement with the rack teeth, whereby the lever is released to immediately return to starting position causing the wheel 43 on lever 38 to roll along the underside of bar 45. The greater the strain applied to this movement by the controlling lever, the greater the frictional pressure of the brake shoes against their respective bars, whereby the weighted arms are permitted to return as slowly as desired back to starting position, but under perfect control of the operator, and as the weight arms approach their position of rest the tension is gradually increased until the arms cease swinging. If, however, by any carelessness on the part of the operator the levers are permitted to return too quickly, the roll 43 will engage this safety cam 55 which will immediately apply brakes and stop the arms and so prevent damage by an excessive backward swing.

It will be noted that by the arrangement of the mechanism illustrated in my improved testing machine, that the pull is applied through the screw 23, and the resistance is effected by the hub through chain 25 all in a direct or straight line of pull, whereby the greatest accuracy is obtained which is a feature in machines of this character as a most accurate indication of the test is demanded. To further carry out this feature, I have employed two spaced apart depending weighted arms connected to the hub 26 and have connected this resistance chain to this hub intermediate the weighted arms, whereby the pull on the bearings is equally divided and the friction of this resistance reduced to the minimum. In most cases such correct indications are demanded that it is necessary to provide means for overcoming even the inertia or friction of the moving parts, and to accomplish this, I have provided a bell crank lever 56 pivoted at 57 to the frame of the machine. One arm of the bell crank is provided with an adjustable counter-weight 58 while its opposite arm 59 engages a roll 60 on the carriage 17, whereby the gravity of the weight 58 acts through the arm 59 to carry the carriage forward and so overcome the inertia of this carriage and the weight of chain 25, so that when the test is in progress the friction of the carriage movement and the sagging of the chain 28 is counterbalanced and therefore this effect upon the indicating instrument will be *nil*.

I have shown and described one form of apparatus for obtaining the most accurate results for measuring the tensile strength of the material to be tested and means for readily operating this mechanism, but I do not wish to be restricted to the exact mechanism shown and described as any mechanism for accomplishing this result will fall within the spirit and scope of my invention.

I claim:

1. In a testing machine, means for applying tension to the material to be tested, a weight moved by and in proportion to the tension applied, means for temporarily retaining said weight in adjusted position and a single element operable to effect the release of said weight and control its return to normal.

2. In a testing machine, means for applying tension to the material to be tested, a weighted arm moved by and in proportion to the tension applied, a brake, means for temporarily retaining said arm in adjusted position, and means for releasing said retaining means and automatically applying said brake for controlling the return movement of said arm.

3. In a testing machine, means for applying tension to the material to be tested, a weighted arm moved in proportion to the tension applied, a gage operated by the movement of said arm, a brake, pawls for positively retaining said arm in adjusted position, means for readily releasing said pawls and a lever for setting said brake and controlling the return of said arm to normal.

4. In a testing machine, means for applying tension to the material to be tested, a weighted arm moved in proportion to the tension applied, a gage operated by the movement of said arm, means for positively retaining said arm in adjusted position, means for readily releasing the retaining means, a brake for controlling the return of said arm to normal and manually operated means for releasing said retaining means and applying said brake by the operation of a single element.

5. In a testing machine, means for applying tension to the material to be tested, a weighted arm moved in proportion to the tension applied, means for positively retaining said arm in adjusted position, means for readily releasing the retaining means, a brake and a single element operable to effect the release of said retaining means apply said brake and control the return of said arm to normal.

6. In a testing machine, means for applying tension to the material to be tested, a weighted arm moved in proportion to the tension applied, means for positively retaining said arm in adjusted position, a brake, a hand operated lever for readily releasing the retaining means and applying said brake for controlling the return of said arm to normal.

7. In a testing machine, means for applying tension to the material to be tested, a weighted arm moved by and in proportion to the tension applied, means for temporarily retaining said arm in adjusted position, means whereby the retaining means may be released and the arm readily returned to normal, means for controlling the return movement of said arm, and means for automatically applying additional resistance to the movement of said arm to prevent it from swinging back past its normal position.

8. In a testing machine, means for applying tension to the material to be tested, a weighted resistance arm moved by the tension applied, a rack bar, a pawl on said arm engaging the teeth on said bar, a brake and a manually operated lever for releasing said pawl and setting said brake to control the return of said arms to normal.

9. In a testing machine, means for applying tension to the material to be tested, a weighted arm moved by and in proportion to the tension applied, means for temporarily retaining said arm in adjusted position, means for controlling the return movement of said arm, and means actuated by the return controlling means for releasing said retaining means.

10. In a testing machine, means for applying tension to the material, a weighted arm moved by and in proportion to the tension applied, means for temporarily retaining said arm in adjusted position, means for controlling the return movement of said arm, means actuated by the return controlling means for releasing said retaining means, a brake and means operated by the returning means for applying said brake to the movement of said arm.

11. In a testing machine, means for applying tension to the material to be tested, a weight moved by and in proportion to the tension applied, means for temporarily retaining said weight in adjusted position, means for controlling the return movement of said weight and means whereby the retaining means may be automatically released by the operation of the said controlling mechanism.

12. In a testing machine, means for applying tension to the material to be tested, a weight moved by and in proportion to the tension applied, means for temporarily retaining said weight in adjusted position, means for controlling the return movement of said weight and means whereby the retaining means may be automatically released by the weight returning mechanism, a brake, and means operated by said weight controlling mechanism for applying said brake to regulate the return of the weight to normal.

13. In a testing machine, an indicator, an indicator operating hub, a pair of weighted tension arms, tension applying means connected to said hub intermediate said arms, means for retaining said arms in adjusted position and a single element operable to effect the release of said weight and control its return to normal.

14. In a testing machine, an indicator, an indicator operating hub, a pair of tension arms, tension applying means connected to said hub intermediate said arms, a pair of rack bars, pawls on each arm engaging each bar and means for releasing said retaining means and automatically applying said brake for controlling the return movement of said arms.

15. In a testing machine, an indicator, an indicator operating hub, a weighted tension arm connected to said hub, means for controlling the return of said arm when moved from normal, tension applying mechanism, and a counterbalance arranged to compensate for the inertia of the moving parts.

16. In a testing machine, an indicator, an indicator operating hub, a weighted tension arm connected to said hub, means for controlling the return of said arm when moved from normal, tension applying mechanism and an equalizing counter-weight for counterbalancing the effect of inertia of the moving part upon the indicator.

17. In a testing machine, an indicator, an indicator operating hub, a weighted tension arm connected to said hub, means for controlling the return of said arm when moved from normal, tension applying mechanism, a pivoted lever, and a counterbalance weight adjustably mounted on said lever acting upon the moving parts for equalizing the effect of inertia of said moving parts upon said indicator.

In testimony whereof I affix my signature.

HENRY L. SCOTT.